(12) United States Patent
Kheirkhahi et al.

(10) Patent No.: US 9,210,535 B2
(45) Date of Patent: Dec. 8, 2015

(54) SYSTEMS AND METHODS FOR ACTIVE INTERFERENCE CANCELLATION TO IMPROVE COEXISTENCE

(71) Applicant: QUALCOMM Incorporated, San Diego, CA (US)

(72) Inventors: Alireza Kheirkhahi, Santa Clara, CA (US); Shahram Abdollahi-Alibeik, Los Gatos, CA (US); Lalitkumar Nathawad, Fremont, CA (US); Ke Gong, Irvine, CA (US); Ali Agah, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/645,346

(22) Filed: Oct. 4, 2012

(65) Prior Publication Data
US 2014/0099893 A1    Apr. 10, 2014

(51) Int. Cl.
*H04W 4/00*     (2009.01)
*H04B 1/525*    (2015.01)
*H04J 11/00*    (2006.01)

(52) U.S. Cl.
CPC ............... *H04W 4/008* (2013.01); *H04B 1/525* (2013.01); *H04J 11/0023* (2013.01)

(58) Field of Classification Search
USPC ......... 455/41.1, 63.1, 278.1, 279.1, 296, 302, 455/304, 305, 307, 130; 333/138, 172
See application file for complete search history.

(56) References Cited

U.S. PATENT DOCUMENTS

| | | | |
|---|---|---|---|
| 6,539,204 B1 | 3/2003 | Marsh et al. | |
| 6,915,112 B1 | 7/2005 | Sutton et al. | |
| 7,231,192 B2 * | 6/2007 | Suzuki et al. | 455/130 |
| 7,633,358 B2 * | 12/2009 | Nakasha et al. | 333/138 |
| 7,657,228 B2 | 2/2010 | Rubin et al. | |
| 7,796,716 B2 | 9/2010 | Bhukania et al. | |
| 8,027,642 B2 | 9/2011 | Proctor, Jr. et al. | |
| 2003/0001648 A1 | 1/2003 | Okazaki et al. | |
| 2006/0178157 A1 | 8/2006 | Gebara et al. | |
| 2010/0227570 A1 | 9/2010 | Hendin | |
| 2011/0212696 A1 | 9/2011 | Hahn et al. | |
| 2014/0376416 A1 * | 12/2014 | Choi | 370/277 |

OTHER PUBLICATIONS

International Search Report and Written Opinion—PCT/US2013/063322—ISA/EPO—Feb. 4, 2014.

* cited by examiner

*Primary Examiner* — Thanh Le
(74) *Attorney, Agent, or Firm* — QUALCOMM Incorporated IP Department

(57) ABSTRACT

This disclosure describes techniques for providing active interference cancellation in a wireless communication system having a Bluetooth transmit chain and a WLAN receive chain. A signal sampled from the Bluetooth transmit chain is gain and phase adjusted to offset interference in the WLAN receive chain. A quadrature phase shifter may be used to generate quadrature components of the sampled signal that are selectively combined to achieve a desired phase adjustment. The phase shifter may be stabilized by a variable capacitor. These techniques may be extended to MIMO systems.

22 Claims, 6 Drawing Sheets

SYSTEMS AND METHODS FOR ACTIVE INTERFERENCE CANCELLATION TO IMPROVE COEXISTENCE

FIELD OF THE PRESENT INVENTION

The present disclosure generally relates to wireless communications and more particularly relates to systems and methods for enhancing the coexistence of wireless local area network (WLAN) and BLUETOOTH® ("Bluetooth") networks.

BACKGROUND OF THE INVENTION

The recent proliferation of devices employing wireless technologies has led to the incorporation of devices with multiple wireless communication systems. Bluetooth is often used to connect and exchange information between mobile phones, computers, digital cameras, wireless headsets, speakers, keyboards, mice or other input peripherals, and similar devices. Bluetooth allows for the creation of a personal area network (PAN) between a master and up to seven slaves. WLAN systems, such as those defined by IEEE 802.11 protocols, are typically directed to longer range communications and larger networks. WLAN communications provide relatively high data rates over relatively long distances, offering an easy interface to existing network infrastructures. Accordingly, it is often desirable to implement both Bluetooth and (WLAN) radios in a single device. Furthermore, it is also often desirable to implement both communication modules on a single integrated circuit (IC), for example in conjunction with other components of the device in a system on a chip (SoC) architecture.

Despite the advantages of providing Bluetooth and WLAN functionalities, careful design is required to minimize interference and improve the quality of service. For example, the physical proximity of the Bluetooth and WLAN modules may result in the transmission of one radio generating interference that impairs reception in the other radio. These problems may be exacerbated when the design of the device involves the sharing of a single antenna among both radios.

In the context of devices employing Bluetooth and WLAN radios, a Bluetooth transmission can be characterized as interference with respect to WLAN reception of the desired signal. WLAN and Bluetooth radio both may operate within the 2.4 GHz industrial, scientific and medical (ISM) band. Although the bandwidth of the Bluetooth signal is fairly narrow at 1 MHz as opposed to the 20 or 40 MHz of a WLAN channel, the Bluetooth protocol utilizes frequency hopping, making it difficult for the WLAN radio to settle on a stable channel and desensitization of the WLAN receiver may result. As such, WLAN reception performance may be degraded if interference due to the Bluetooth transmission is not mitigated.

SUMMARY OF THE INVENTION

This disclosure is directed to systems and methods for providing active interference cancellation in a wireless communication device having a Bluetooth transmit chain and a WLAN receive chain. In one aspect, suitable methods include the steps of sampling a signal from the Bluetooth transmit chain, generating a plurality of quadrature components of the sampled signal with a polyphase filter quadrature radio-frequency (RF) phase shifter, and adjusting a phase of the sampled signal by weighting and combining the plurality of quadrature components to create an output signal.

Further, the methods may also include the step of controlling an absolute phase of the output signal by reducing variations in a load applied to the phase shifter. In some embodiments, reducing variation in the load applied to the phase shifter may include using a variable capacitor to compensate for variations in the load. Additionally, the methods may include the step of receiving feedback from the WLAN receive chain, wherein variations in the load are reduced in response to feedback from the WLAN receive chain.

In another aspect, the methods may include the further step of adjusting the amplitude of the output signal. Adjusting the amplitude of the output signal may be performed in response to feedback from the WLAN receive chain. For example, feedback from the WLAN receive chain may be a receive signal strength indicator (RSSI) a signal to noise ratio (SNR), bit error rate (BER), an error vector magnitude (EVM), or another indicator of receive performance.

In yet another aspect, the method may include selectively increasing the frequency of a clock signal generated by a clock source used by the Bluetooth transmit chain. The clock frequency may be doubled based upon an operational state of the WLAN receive chain.

This disclosure is also directed to devices for wireless communication having a Bluetooth transmit chain, a WLAN receive chain, and an active interference cancellation module coupled to the Bluetooth transmit chain and the WLAN receive chain, wherein the active interference cancellation module includes a sampler configured to sample a signal from the Bluetooth transmit chain, a polyphase filter quadrature radio-frequency (RF) phase shifter configured to generate a plurality of quadrature components of the sampled signal, and combination logic configured to adjust a phase of the sampled signal by weighting and combining the plurality of quadrature components to create an output signal. The active interference cancellation module may be further configured to output the output signal to the WLAN receive chain. Additionally, the active interference cancellation module may include a variable gain block in a signal path for a quadrature component configured to adjust the gain of the quadrature component. For example, the variable gain block may be implemented using a variable gain amplifier (VGA), a variable capacitive divider or a combination of both.

In one aspect, the active interference cancellation module may also include a load adjuster configured to reduce variations in a load applied to the phase shifter. The load adjuster may be a variable capacitor such that the active interference cancellation module may reduce variations in the load applied to the phase shifter by adjusting the variable capacitor. Further, the device may include a controller coupled to the active interference cancellation module and WLAN receive chain, such that the controller may receive feedback from the WLAN receive chain and send signals to the active interference cancellation module to adjust the variable capacitor in response to feedback from the WLAN receive chain.

In another aspect, the active interference cancellation module may be configured to adjust the amplitude of the output signal. In such embodiments, the device may also include a controller coupled to the active interference cancellation module and WLAN receive chain, such that the controller may receive feedback from the WLAN receive chain and send signals to the active interference cancellation module to adjust the amplitude in response to feedback from the WLAN receive chain. The feedback may include a receive signal strength indicator (RSSI), a signal to noise ratio (SNR), a bit error rate (BER), an error vector magnitude (EVM), or the like.

Further aspects include embodiments wherein the Bluetooth transmit chain includes a frequency source generating a clock signal such that the device also includes a circuit configured to increase the frequency of the clock signal. In one embodiment, the frequency source may be doubled based upon an operational state of the WLAN receive chain.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

Figure 1:
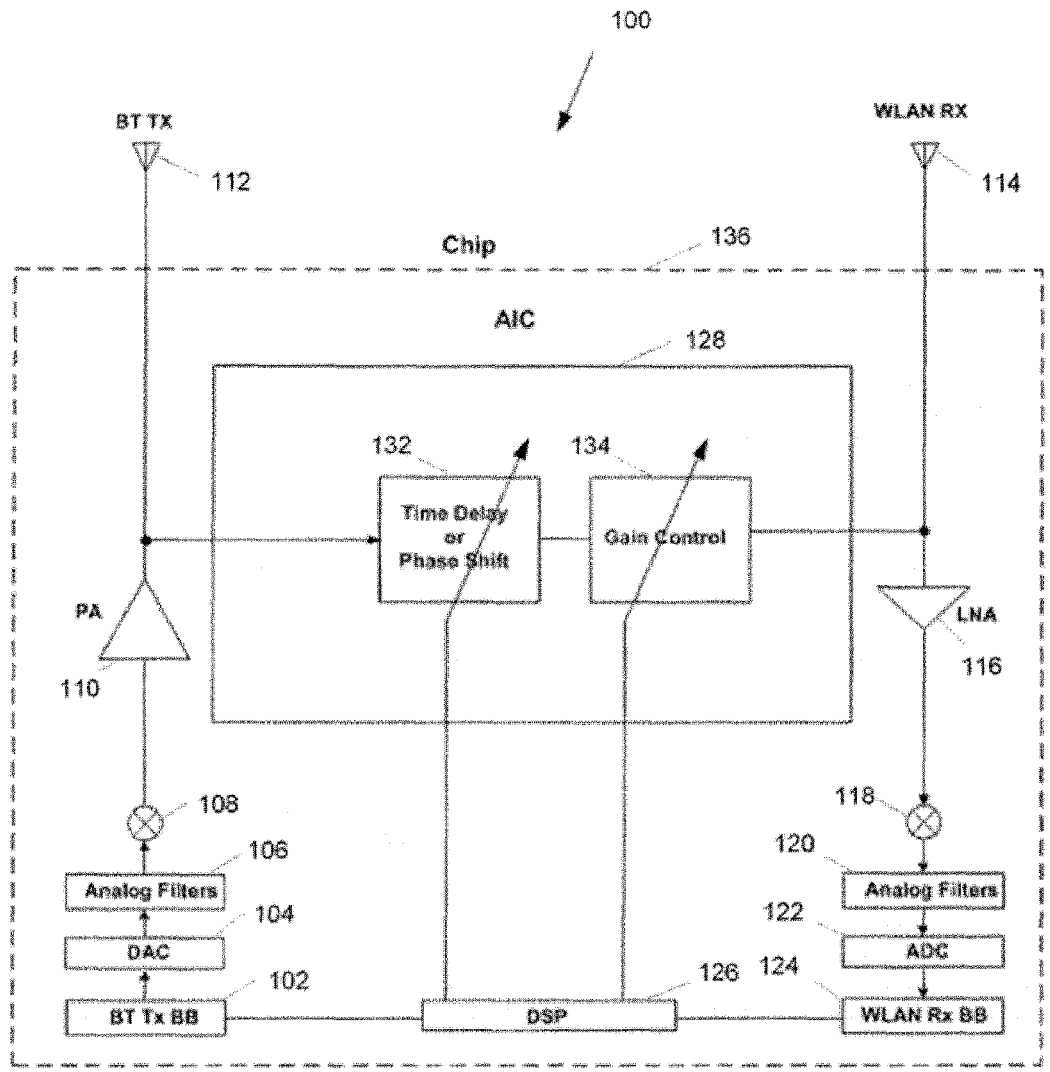
FIG. 1 is a high level schematic diagram of a circuit design employing active cancellation in a transceiver device having combined Bluetooth and WLAN communication systems, according to an embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to WLAN and Bluetooth systems, the techniques of this disclosure may be applied to other wireless communication systems that suffer from interference due to the use of multiple radios.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

Active cancellation is a beneficial strategy that may be used to facilitate the coexistence of multiple radios in a single device. Specifically, when the characteristics of the interference are sufficiently known, a complementary cancellation signal that is 180° degrees out of phase may be injected into the receive chain to remove, suppress, negate or otherwise substantially minimize the interference experienced in the received signal. In devices having both Bluetooth and WLAN radios, the Bluetooth transmission may be directly sampled and used to generate the cancellation signal that is injected into the WLAN receive chain. Suitable details regarding the use of active interference cancellation in wireless communication devices may be found in co-pending U.S. patent application Ser. No. 12/769,536, filed Apr. 29, 2010 {Qualcomm Ref. No. 112183 "Active Cancellation of Interference in a Wireless Communication System"}, which is hereby incorporated in its entirety by reference.

To more effectively cancel the interfering signal, it is desirable to utilize techniques to generate a phase adjusted signal by selectively combining the in-phase (I) and quadrature (Q) components of the sampled signal, which may be referred to as the quadrature components, to provide a phase adjusted signal. Further, it is desirable to maintain the quadrature components at matched amplification levels to provide more accurate phase adjustment. In addition, it is desirable to provide these aspects without introducing undue overhead to the system. It is also desirable to provide techniques for achieving these results when the WLAN and Bluetooth radio are combined in a single IC. The teachings of this disclosure satisfy these and other goals.

Turning now to FIG. 1, a schematic diagram of high level functional blocks of a circuit design employing active cancellation in a transceiver device 100 having combined Bluetooth and WLAN communication systems is shown. In this example, the Bluetooth transmitter is characterized as the interference source that may cause performance degradation in the WLAN reception. The main components of the Bluetooth transmit chain include baseband module 102 with an output that is fed to digital to analog converter (DAC) 104 and then analog filters 106 before being upconverted to an RF signal by mixer 108 driven by a suitable local oscillator (LO, not shown.) The RF signal from mixer 108 is then fed to power amplifier (PA) 110 before being transmitted by antenna 112. Likewise, the main components of the WLAN receive chain include antenna 114 that receives an RF signal which is then amplified by low noise amplifier (LNA) 116 and mixed down to baseband frequency by mixer 118, driven by a suitable LO (also not shown.) The output of mixer 118 is filtered by analog filters 120, converted to a digital signal by analog to digital converter (ADC) 122 and processed by WLAN baseband module 124. As shown, digital signal processor (DSP) 126 controls both WLAN and Bluetooth baseband modules.

An active interference cancellation (AIC) module 128 is coupled between the Bluetooth transmit chain and the WLAN receive chain. The interfering Bluetooth RF transmission is sampled by coupling to the transmit chain with a suitable sampler. In the embodiment shown, the coupling is positioned after PA 110, preferably by direct connection, capacitive-divider, directional coupler, power splitter or other suitable circuit. Alternatively, the transmit chain can be sampled at an earlier point as desired. In other embodiments in which antenna 112 is shared by both transmit and receive chains, a directional coupler may be employed. In yet another embodiment, the interfering Bluetooth signal may be replicated by using information from the digital domain of Bluetooth baseband 102, converting that information to an analog signal which is then mixed to RF.

As shown in FIG. 1, AIC module 128 receives the sampled signal from the Bluetooth transmit chain and varies the phase of the signal at phase shifter module 132. The phase adjusted output signal is then fed to gain module 134 to adjust the amplitude of the signal to provide a desired suppression of interference in the receive chain. The phase and gain control aspects of AIC module 128 are discussed in detail below. The phase and gain adjusted signal is then injected into the WLAN receive chain. In this embodiment, the signal is coupled upstream of LNA 116, but may also be connected at other locations prior to ADC 122 as desired either in current mode or in voltage mode. Also, as shown, phase shifter module 132 and gain module 134 are preferably controlled by DSP 126. In other embodiments, a dedicated AIC controller may be employed as desired.

In some embodiments, the techniques of this disclosure are configured to be implemented within a single IC chip, which is designated by boundary line 136. Substantially all the functional components described above are present in the chip, with only antennas 112 and 114 being located off chip. In other embodiments, the functions associated with sampling the signal representing interference, adjusting the gain and phase of the sampled signal, and injecting the signal into the receive chain, and the like may be performed across multiple components. As noted above, the functions may be performed using hardware, using software, or using a combination of hardware and software as warranted by the application and as desired.

As shown, phase shifter module 132 is configured to adjust the phase of, or variably delay, the sampled signal to obtain a desired level of interference cancellation in the WLAN receive chain. Since the delay adjustments typically required are on the order of nanoseconds, it may be difficult to implement the adjustment digitally as a time delay on chip. Phase shifter module 132 may configured to adjust the phase of the sampled signal by selectively combining the quadrature components. To this end, phase shifter module 132 may include a quadrature radio-frequency (RF) phase shifter, such as a polyphase filter, to provide the RF quadrature components of the sampled signal. Polyphase filters typically are highly symmetric circuits of alternating resistors and capacitor pairs, connected in parallel. As a result of the symmetry, the quadrature outputs of the polyphase filter are substantially equally balanced and may exhibit a phase relationship of substantially 90°. These characteristics allow phase shifter module 132 to impart a desired phase to the sampled signal by performing a weighted combination of the I and Q signals through the use of appropriate combination logic.

The resistor-capacitor pairs produce an asymmetrical frequency transfer function about the zero frequency. The zero frequency may be derived using equation (1):

$$R \cdot C \cdot \omega = 1, \tag{1}$$

where R is the resistance, C is the capacitance and $\omega$ is the angular frequency of the circuit. Polyphase filters are generally used for image rejection and I and Q signal generation. These circuits, as used herein, exhibit low I/Q gain and phase mismatch over process, voltage and temperature (PVT) variations allowing their use in a wide variety of conditions. The two-stage polyphase design also represents a relatively minimal load on the Bluetooth PA and feature a flatter phase response around the zero frequency.

The 0 and 90° phase shifted outputs of the RF polyphase filter may be weighted appropriately and added or subtracted to provide a combined, phase adjusted output signal. In one aspect the weighting functionality may be implemented using programmable gain amplifying and attenuating stages, such as with a variable gain amplifier (VGA), that may be configured to provide a regular or inverted output. In some embodiments, the add or subtract functionality may be implemented in current mode to provide load sharing and may reduce the area occupied by the associated circuits. The appropriate weighting and combination of the quadrature components may be determined in response to suitable feedback from the WLAN receive chain indicating the degree to which the interfering Bluetooth transmission is being offset by the signal generated by the AIC module. Examples of characteristics for providing feedback may include a receive signal strength indicator (RSSI), a signal to noise ratio (SNR), a bit error rate (BER), an error vector magnitude (EVM) and any other suitable indicators of receive performance. The phase may then adjusted as appropriate to reduce the amount of interference at the WLAN receive chain until a desired level of cancellation is achieved.

Figure 2:
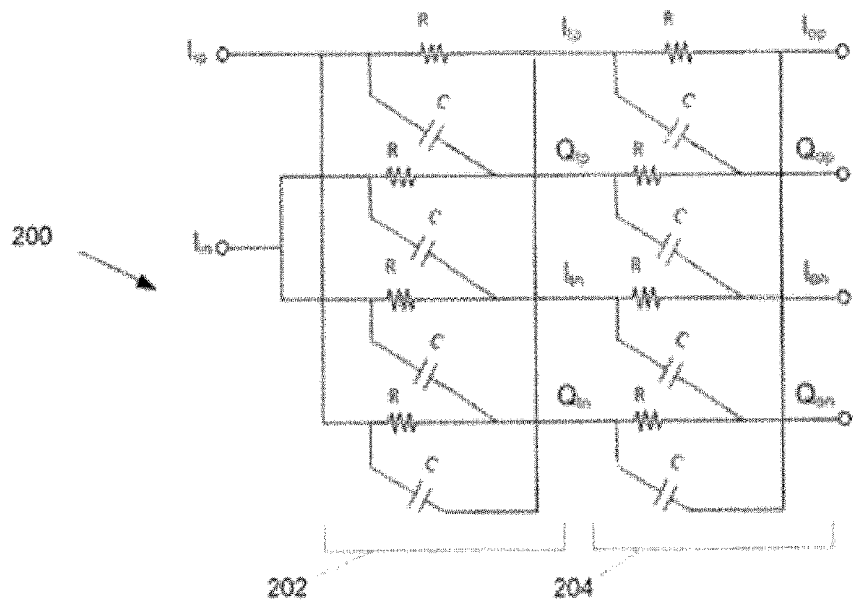
FIG. 2 is a schematic representation of a suitable polyphase filter RF phase shifter, suitable for incorporation into a transceiver device, according to an embodiment of the invention.

One suitable polyphase filter useful in the practice of this disclosure is two-stage RF polyphase filter 200 depicted in FIG. 2. The RF signal sampled from the Bluetooth transmit chain is fed as inputs $I_{ip}$ and $I_{in}$ into a first stage 202 of polyphase filter 200. The intermediary signals generated by first stage 202 are the decomposed I and Q components, which are then fed as the inputs $I_{tp}$, $Q_{tp}$, $I_{tn}$, and $Q_{tn}$ into a second stage 204 of polyphase filter 200, finally resulting in the outputs, $I_{op}$, $Q_{op}$, $I_{on}$, and $Q_{on}$ which represent the phase shifted quadrature components of the RF signal. Accordingly, in one aspect polyphase filter 200 may exhibit a substantially flat phase shift across a relevant frequency range. In another aspect, polyphase filter 200 may exhibit substantially unchanged gain across a relevant frequency range.

Figure 3:
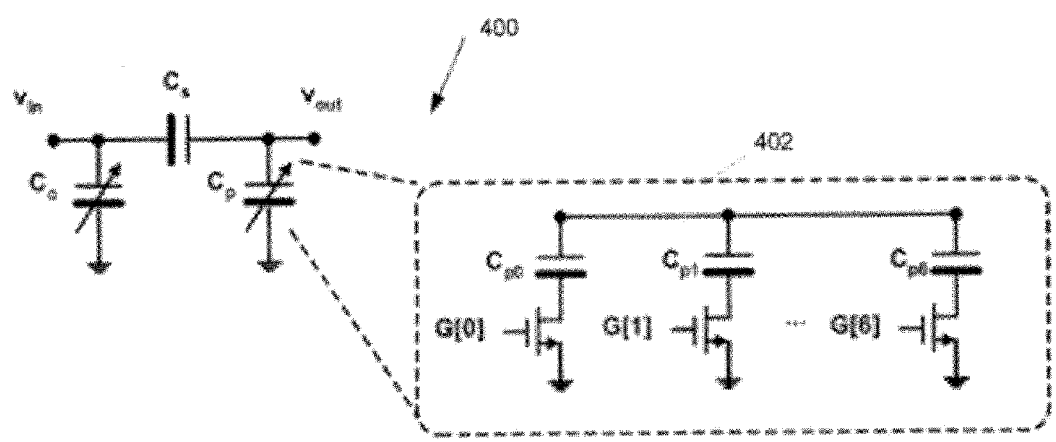
FIG. 3 is a schematic representation of a suitable circuit for controlling the load on a polyphase filter RF phase shifter using a variable capacitor and for controlling the gain of a sampled signal using a variable capacitive divider, suitable for incorporation into a transceiver device, according to an embodiment of the invention.

In addition to the accurate 0/90° relative phase shift imparted to the quadrature components, polyphase filters such as RF polyphase filter 200 may exhibit an absolute phase that varies with load. In some embodiments, the techniques of this disclosure may employ a load adjuster to stabilize or otherwise reduce deviations in the load on RF polyphase filter 200 and thereby control the absolute phase of the output by keeping the load substantially constant. In one embodiment, variable capacitor block 400 as shown in FIG. 3 may be used to compensate for variations in load that may otherwise result from applying the sampled signal to polyphase filter 200, keeping the load substantially constant and unperturbed by the sampled signal. As desired, variable capacitor block 400 may also be used to adjust the gain of the quadrature signal components. The variable capacitive divider 400 may comprise a pi-network of two variable capacitors $C_p$ and $C_c$ forming the legs and bridged by capacitor $C_s$. As shown, variable capacitor $C_c$ may be connected at the input $V_{in}$ and be configured to keep the impedance constant at all settings. Further, the variable capacitive divider formed by variable capacitor $C_p$ and capacitor $C_s$ may provide additional gain control of the quadrature components. A suitable implementation for the variable capacitors includes a plurality of switched capacitors as shown by detail 402 with regard to variable capacitor $C_p$. Specifically, a plurality of fixed capacitors $C_{p0}$, $C_{p1}$, . . . , $C_{p6}$ may each be connected to the drain of a corresponding plurality of metal oxide semiconductor field effect transistors (MOSFETs) G[0], G[1], . . . G[6], or their equivalent, in a switching network such that a control signal from DSP 126 (FIG. 1) applied to the gate of the MOSFET couples its corresponding capacitor into the circuit. In some embodiments, it may be desirable to configure variable capacitor block 400 to provide coarse and fine grained adjustment steps.

Polyphase filter 200 may be characterized as exhibiting varying absolute phase depending upon the load. Accordingly, DSP 126 is preferably configured to adjust the capacitance developed at $C_p$ to stabilize the load applied to polyphase filter 200 and thereby reduce any absolute phase shift exhibited by RF phase shifter 200 to correspondingly reduce degradation in the accuracy of the I and Q outputs. Each capacitance setting may provide a substantially linear and consistently spaced phase response across the relevant frequency band. The appropriate capacitance value may be determined in response to suitable feedback from the WLAN receive chain indicating the degree to which the interfering Bluetooth transmission is being offset by the signal generated by the AIC module. Examples of characteristics for providing feedback may include a receive signal strength indicator (RSSI), a signal to noise ratio (SNR), a bit error rate (BER), an error vector magnitude (EVM) and any other suitable indicators of receive performance. The capacitance may then be tuned as appropriate to minimize the amount of interference at the WLAN receive chain.

As depicted in FIG. 1, the phase adjusted signal output by phase shifter module 132 may be fed to gain module 134 to adjust the amplitude of the signal to provide a desired level of suppression of interference in the receive chain. In the exemplary embodiments discussed below, gain module 134 is implemented with a variable transconductance amplifier, a variable capacitive divider, and a variable gain amplifier, but other combinations or equivalent elements may be used as desired. The appropriate amplitude adjustment of the phase adjusted signal also may be determined in response to suitable feedback from the WLAN receive chain indicating the degree to which the interfering Bluetooth transmission is being offset by the signal generated by AIC module 128. Examples of characteristics for providing feedback may include a receive signal strength indicator (RSSI), a signal to noise ratio (SNR), a bit error rate (BER), an error vector magnitude (EVM) and any other suitable indicators of receive performance. The amplitude may then adjusted as appropriate to reduce the amount of interference at the WLAN receive chain until a desired level of cancellation is achieved. Further, as discussed below, phase adjustment by phase shifter module 132 involves individually adjusting the gain of the quadrature components of the sampled signal. Accordingly, all or part of the amplitude adjustment path represented by gain module 134 may be shared with the phase adjustment path represented by phase shifter module 132.

Figure 4:
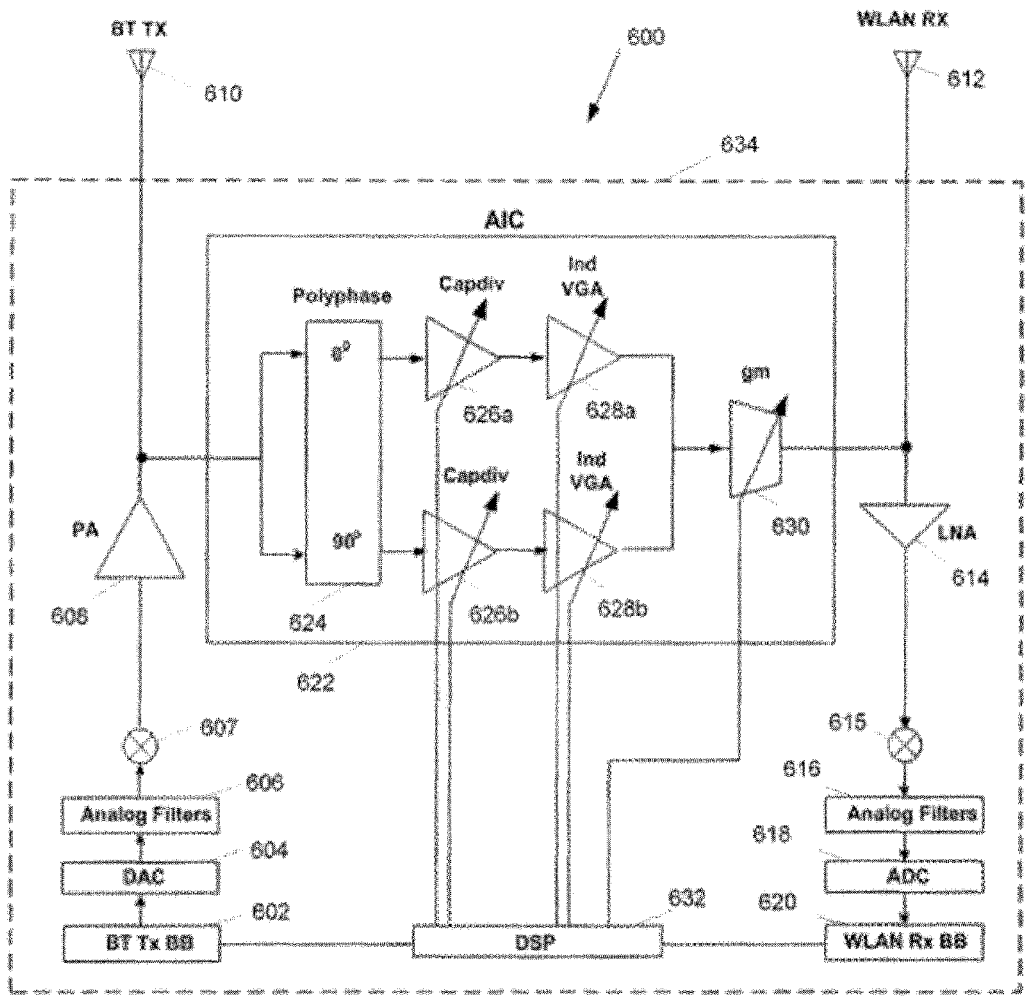
FIG. 4 is a schematic representation of a single chip architecture suitable for a transceiver device having a Bluetooth and single chain WLAN radio employing a polyphase filter RF phase shifter, according to an embodiment of the invention.

One simplified circuit diagram indicating functional elements and configured for implementation on a single chip to provide AIC for a combined Bluetooth and WLAN transceiver device is shown in FIG. 4. Generally device 600 includes a Bluetooth transmit chain in the form of a Bluetooth baseband module 602 connected to a DAC 604, analog filters 606, mixer 607 and PA 608 as described above. The output from PA is fed to antenna 610 and transmission of this Bluetooth signal may be received as interference by antenna 612 that is linked to the WLAN receive chain. As described above, an RF signal being received by antenna 612 is generally fed to LNA 614, then to mixer 615, analog filters 616 and ADC 618 and the WLAN baseband module 620 for decoding.

The AIC 622 module is connected, as shown between the output of PA 608 and the input of LNA 614, also as described above. The signal sampled from the output of PA 608 is fed to polyphase filter 624 to provide the suitable relative 0/90° phase alignment of the I and Q component outputs. The absolute phase of polyphase filter 624 is controlled by minimizing deviations in the load on polyphase filter 624 by adjustment of parallel variable capacitor blocks 626a and 626b. The quadrature signal is then sent to a matching pair of VGAs 628a and 628b so the quadrature components may be weighted and optionally inverted before combination to produce the phase adjusted output signal. In some embodiments, it may be desirable to configure VGAs 628a and 628b to provide coarse and fine grained adjustment steps. The quadrature output is combined and delivered to transconductance ($g_m$) amplifier gm 630 for additional gain adjustment of the phase adjusted signal prior to being injected into the WLAN receive chain upstream of LNA 614. In the embodiment shown, DSP 632 is configured to monitor interference conditions experienced by the WLAN receive chain by receiving information from WLAN baseband module 620. Based upon this information, DSP 632 may then apply suitable controls to VGAs 628a and 628b to weight the quadrature signals, to variable capacitor blocks 626a and 626b to stabilize the load on polyphase filter 624 and adjust gain and to gm 630 to adjust the amplitude of the phase adjusted signal to reduce the interference caused by Bluetooth transmissions sent by antenna 610. This embodiment is preferably implemented on a single chip as indicated by boundary line 634 that delineates the components integrated into the chip. Of the elements discussed, only antennas 610 and 612 are located off chip.

Figure 5:
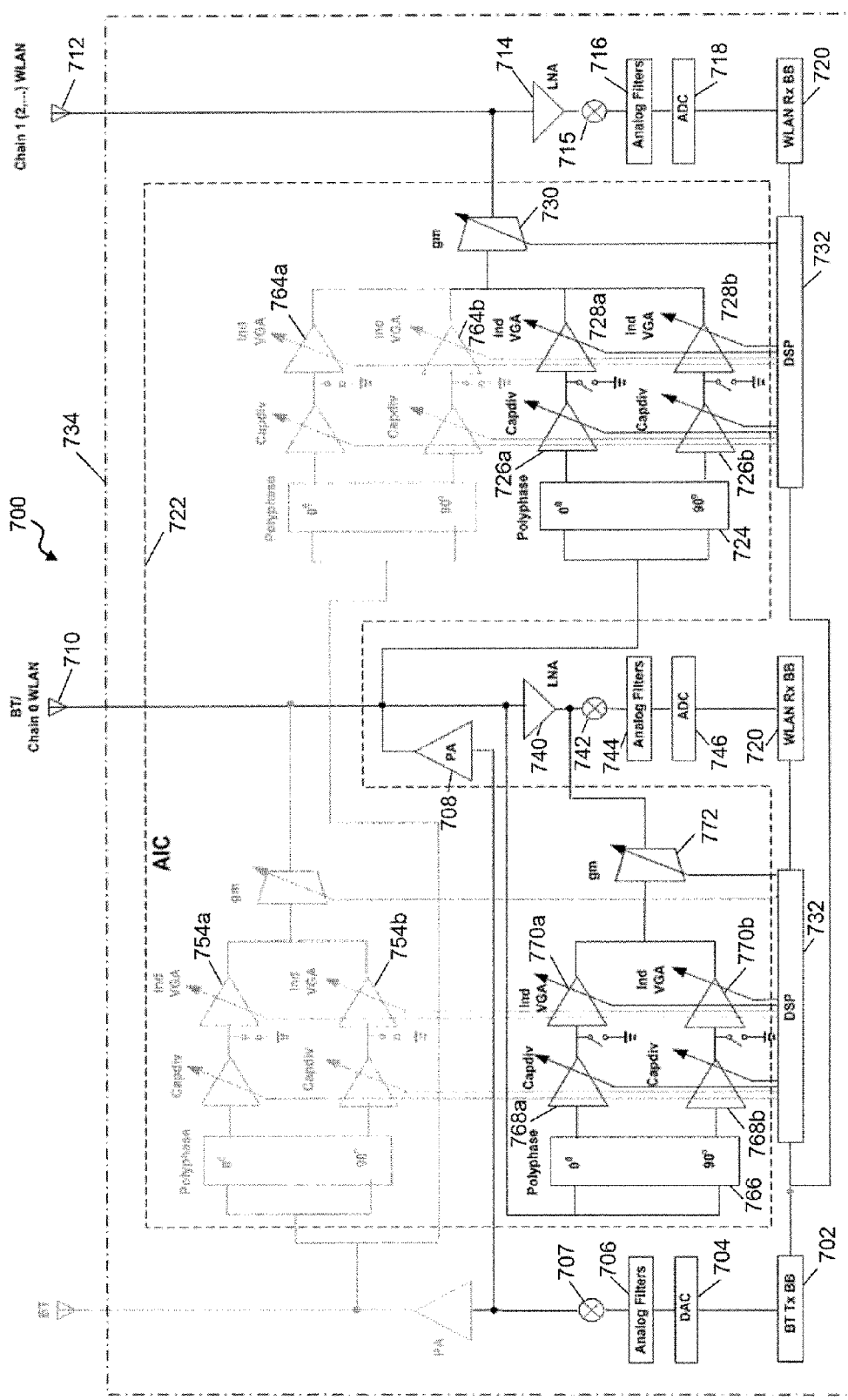
FIG. 5 is a schematic representation of a single chip architecture suitable for a transceiver device having a Bluetooth and a MIMO WLAN radio employing a polyphase filter RF phase shifter, wherein the Bluetooth and WLAN radios share a common antenna, according to an embodiment of the invention.
Figure 6:
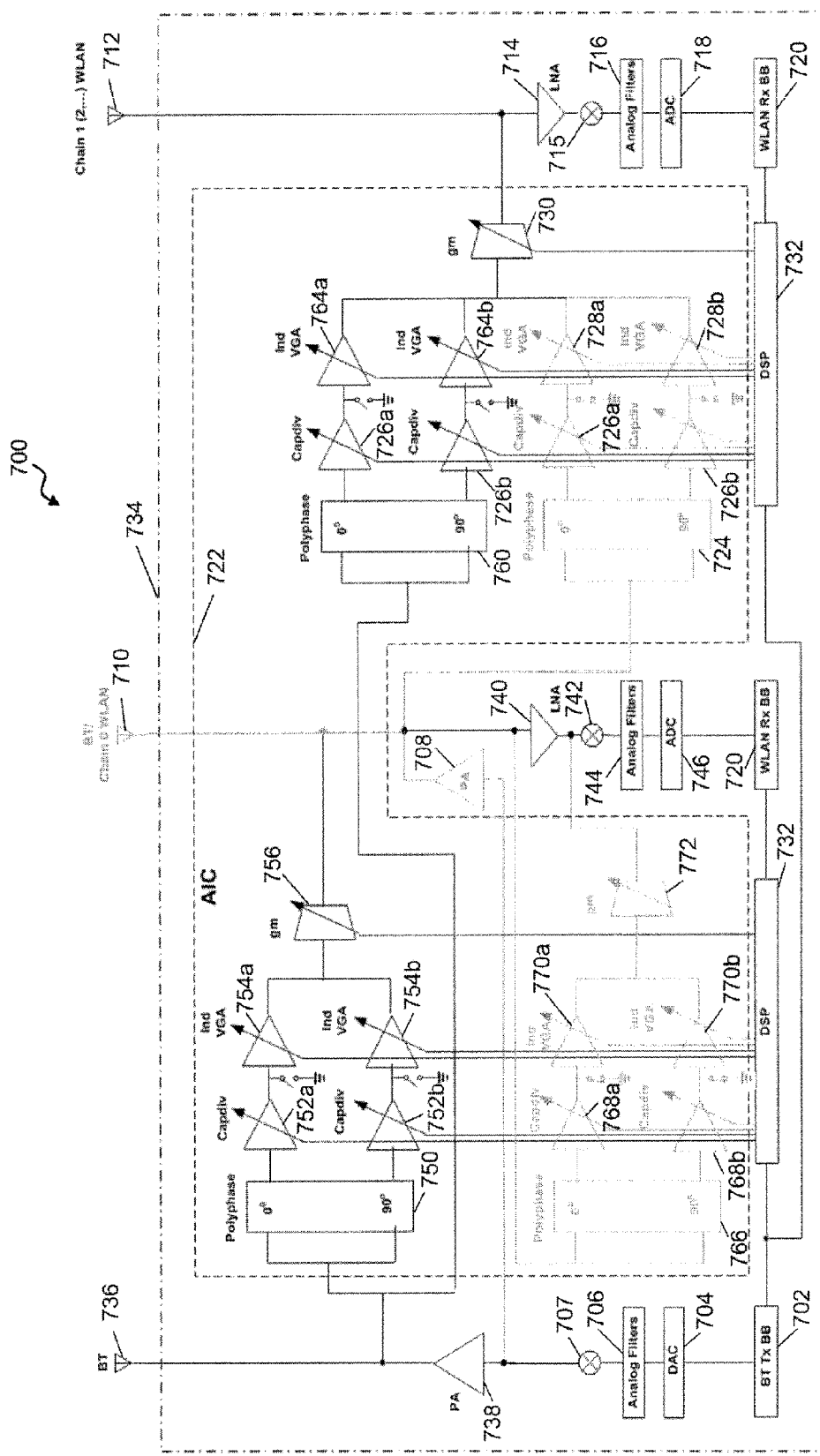
FIG. 6 shows the chip architecture of FIG. 5 configured for use when the Bluetooth and WLAN radios do not share a common antenna, according to an embodiment of the invention.

FIGS. 5 and 6 illustrate different aspects of an embodiment of combined Bluetooth and WLAN wireless communication device having a multiple input, multiple output (MIMO) WLAN radio. As desired, the circuit design shown in FIGS. 5 and 6 may be adapted to be used in configurations in which the Bluetooth radio shares one of the WLAN MIMO antennas or in which the Bluetooth radio has a dedicated antenna.

First, in the aspect shown in FIG. 5, wireless communication device 700 includes a Bluetooth transmit chain that shares one of the WLAN antennas and generally includes Bluetooth baseband module 702 connected to a DAC 704, analog filters 706 and mixer 707 and is similar to the configurations discussed above. As noted, the Bluetooth transmit chain is configured to share WLAN MIMO antenna 710. To that end, PA 708 is enabled, connecting the Bluetooth transmit chain to antenna 710. An additional WLAN MIMO antenna 712 receives signals, including potential interference from the Bluetooth transmissions. The embodiment depicted shows a total of two WLAN MIMO antennas, but one of skill in the art will recognize that the design can be extended to incorporate additional WLAN radio chains as desired. The signal received by antenna 712 is generally fed to LNA 714, mixer 715, analog filters 716, ADC 718 and then to the WLAN baseband module 720 for decoding.

In this implementation, to provide cancellation for the WLAN receive chain coupled to antenna 712, an AIC module 722 samples the Bluetooth signal being transmitted on antenna 710 at the output of PA 708. In a similar manner to the embodiments described above, the sampled signal is fed to polyphase filter 724 to produce quadrature outputs, variable capacitor blocks 726a and 726b may stabilize the load on polyphase filter 724 and adjust the gain, and VGAs 728a and 728b may weight the individual quadrature signals so that the combined signal exhibits a desired phase adjustment. The phase adjusted signal is amplified by gm 730 to a level that provides a desired level of interference cancellation and injected into the WLAN receive chain upstream of LNA 714. In addition, when antenna 710 is shared, such as when operating in a MIMO mode , cancellation for the WLAN receive chain coupled to antenna 710 may be provided by sampling the Bluetooth signal at the input to LNA 740 as shown. This signal may be fed to polyphase filter 766, variable capacitor blocks 768a and 768b, and then VGAs 770a and 770b for phase and gain adjustment. The amplitude of phase adjusted signal is then adjusted by gm 772 and injected into the WLAN receive chain including mixer 742, analog filter 744 and ADC 746, upstream of LNA 740. In general, the signal generated by AIC 722 may be fed to the WLAN receive chain either upstream or downstream of the LNAs as desired. DSP 732 manages Bluetooth baseband module 702 and WLAN baseband module 720 as well as the gain and phase adjustments performed by AIC 722. These components, save for the antennas, may be implemented on a single chip as indicated by boundary line 734.

Alternatively, as shown in FIG. 6, wireless communication device 700 may be utilized in a configuration featuring dedicated Bluetooth antenna 736. Accordingly, PA 708 is preferably disabled and PA 738 (disabled in the implementation shown in FIG. 5) is enabled to drive antenna 736. Furthermore, since antenna 710 is not being used for Bluetooth transmissions, antenna 710 may be used to receive WLAN signals in a MIMO configuration, such that LNA 740, mixer 742, analog filter 744 and ADC 746 are enabled and supply the WLAN signal to WLAN baseband 720.

This configuration involves WLAN reception on two chains and AIC module 722 is therefore configured to supply the sampled signal to both chains. Since the receive chains are distinct, any interference due to the Bluetooth transmission may exhibit different characteristics even though the source is the same. As such, the sampled signal is preferably phase and gain adjusted for each chain to minimize the effect of the interference. Specifically, the signal sampled at the output of PA 738 is fed simultaneously to a first phase and gain adjustment circuit including polyphase filter 750, variable capacitor blocks 752a and 752b, VGAs 754a and 754b, such that the amplitude of the combined signal may be adjusted by gm 756 and a second phase and gain adjustment circuit including polyphase filter 760, variable capacitor blocks 762a and 762b, VGAs 764a and 764b, such that gain of the combined signal may be adjusted by gm 730, thereby providing independent phase and gain adjustment. As shown, DSP 732 preferably controls both first and second phase and gain adjustment circuits. Each independently adjusted signal is then injected to the WLAN receive chains, at the inputs of LNA 714 and 740, respectively. The phase adjustment circuits may be enabled and disabled as warranted by the desired application by selectively grounding the inputs of the individual VGAs as shown to power them down. For example, in FIG. 5, the inputs of VGAs 754a, 754b, 764a and 764b are grounded, while in FIG. 6, the inputs of VGAs 728a, 728b, 770a and 770b are grounded to disable those circuits. Grounding the inputs of the individual VGAs when not in use also protects from over-stress.

Figure 7:
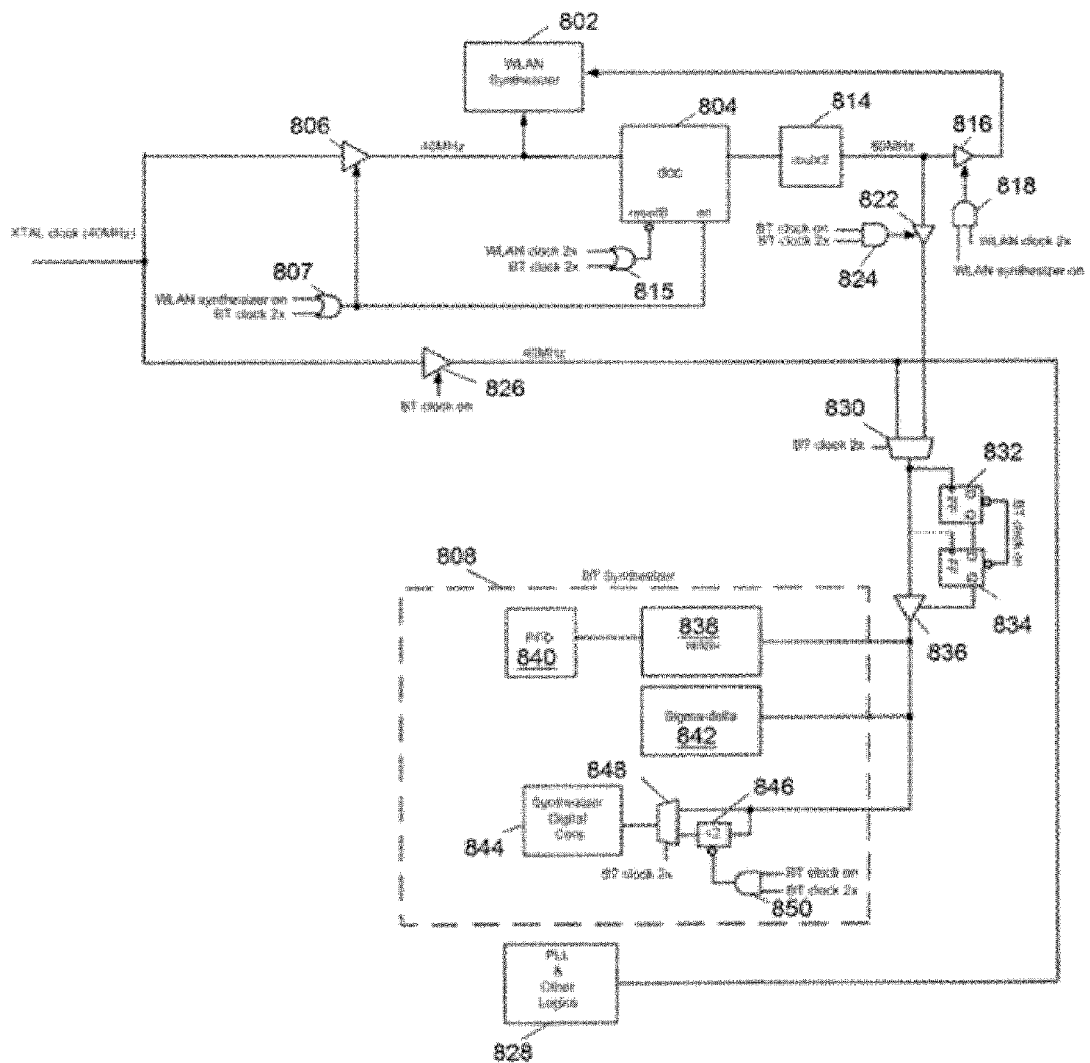
FIG. 7 is a high level schematic diagram of a circuit design employing a clock doubling circuit for the Bluetooth radio for a transceiver device having combined Bluetooth and WLAN communication systems, according to an embodiment of the invention.

Another aspect of the present disclosure is depicted in FIG. 7, which is a high level schematic diagram of a circuit design employing a clock doubling circuit for the Bluetooth radio. In the AIC embodiments discussed above, there may be unwanted energy from oscillating frequency sources such as crystal oscillators and PLLs to leak into other circuit paths, creating spurious signals or "spurs." The problems posed by these aggressor signals may be exacerbated in SoC designs. In particular, AIC performance may be compromised due to spurs accompanying the signal generated by the AIC module. Since there is phase difference between the interference and its spurs, the spurs may not be canceled using the techniques described above. Accordingly, the potential exists for such spurs to get amplified and cause undesirable interference when they fall within the WLAN channel. The most significant spur associated with the Bluetooth transmit chain is the Bluetooth synthesizer reference clock spur which appears at a 40 MHz offset from the LO.

To mitigate the effects of these spurs, certain embodiments of the invention may be configured to increase the frequency of the reference clock to provide greater separation from the WLAN channel. The increased frequency may be implemented by using a frequency multiplier, such as a frequency doubler, or by other suitable means. One embodiment of this technique is shown in FIG. 7, which schematically shows the primary functional components and logic for generating a reference clock signal for the Bluetooth and WLAN systems. In this embodiment, a 40 MHz signal is provided to WLAN frequency synthesizer 802 and duty cycle correction (DCC) module 804 when tri-state buffer 806 is enabled, either by the output of NOR gate 807 which has a WLAN synthesizer on signal and a Bluetooth clock double enable signal as inputs, or an enable signal from DCC module 804. DCC 804 is preferably reset by the output of NOR gate 815 when either the Bluetooth or WLAN clock double enable signal is not set. Following DCC 804, the 40 MHz WLAN synthesizer clock signal is doubled by multiplier 814 and then sent to WLAN synthesizer 802 as an 80 MHz signal when tri-state buffer 816 is activated by AND gate 818 on the basis of the WLAN synthesizer on and WLAN clock double enable signals.

The 80 MHz WLAN synthesizer clock signal is also sent to the Bluetooth synthesizer 808 when tri-state buffer 822 is activated by AND gate 824 on the basis of the Bluetooth clock enable and Bluetooth clock double enable signals. The 40 MHz signal is sent to Bluetooth synthesizer 808 as the Bluetooth clock signal when tri-state buffer 826 is activated by the Bluetooth clock enable signal. The clock signal is used by the Bluetooth baseband phase locked loop (PLL) 828 to generate a Bluetooth reference clock output signal.

Multiplexer 830 controls whether the 40 MHz or the 80 MHz signal is used on the basis of the Bluetooth clock double enable signal. To avoid sending a narrow pulse to Bluetooth synthesizer 808 when the synthesizer and clock start, two cascaded resettable D-type flip flops (R-DFF) 832 and 834 are used to filter clock glitches and provide a stable clock signal to Bluetooth synthesizer 808. As shown, the resets of R-DFF 832 and 834 are connected to a Bluetooth crystal clock enable signal, which is equivalent to the Bluetooth synthesizer on signal during normal operation. The output of R-DFFs 832 and 834 are used to enable tri-state buffer 836, sending the clock signal from multiplexer 830 to functional blocks of Bluetooth synthesizer 808.

The output of buffer 836 is connected within Bluetooth synthesizer 808 to reference divider 838 and phase/frequency detector (PFD) 840, to sigma-delta modulator 842 and to digital synthesizer 844. In this embodiment, the circuit is configured so that digital synthesizer 844 always runs at 40 MHz and no adjustments to the timing of this block are necessary. Divider 846 divides the clock signal by 2 and multiplexer 848 selects the divider 846 output when Bluetooth clock double enable signal is set. To avoid metastability in divider 846 when the clock stops, its reset is triggered by the output of NAND gate 850, which has the Bluetooth crystal clock enable and the Bluetooth clock double enable signals as inputs. As discussed above, metastability when the clock starts is avoided by gating buffer 836 with the output of the R-DFFs 832 and 834. Sigma-delta modulator 842 runs at 80 MHz in the configuration shown, since stable operation at this frequency may be achieved. Preferably, a test mode signal (not shown) allows gating to force operation of Bluetooth synthesizer 808 at 40 MHz.

Described herein are presently preferred embodiments. However, one skilled in the art that pertains to the present invention will understand that the principles of this disclosure can be extended easily with appropriate modifications to other applications.

What is claimed is:

1. A method for providing active interference cancellation between a Bluetooth transmit chain and a wireless local area network (WLAN) receive chain, comprising sampling a signal from the Bluetooth transmit chain, generating a plurality of quadrature components of the sampled signal with a polyphase filter quadrature radio-frequency (RF) phase shifter, and adjusting a phase of the sampled signal by weighting and combining the plurality of quadrature components in response to digital baseband feedback to create an output signal.

2. The method of claim 1, further comprising controlling an absolute phase of the output signal by reducing variations in a load applied to the phase shifter.

3. The method of claim 2, wherein reducing variations in the load applied to the phase shifter comprises using a variable capacitor to compensate for variations in the load.

4. The method of claim 2, further comprising receiving feedback from the WLAN receive chain, wherein variations in the load are reduced in response to feedback from the WLAN receive chain.

5. The method of claim 1, further comprising adjusting an amplitude of the output signal.

6. The method of claim 5, further comprising receiving feedback from the WLAN receive chain, wherein the amplitude is adjusted in response to feedback from the WLAN receive chain.

7. The method of claim 6, wherein feedback from the WLAN receive chain comprises one from the group consisting of a receive signal strength indicator (RSSI), a signal to noise ratio (SNR), a bit error rate (BER), and an error vector magnitude (EVM).

8. The method of claim 1, further comprising outputting the output signal to the WLAN receive chain.

9. The method of claim 1, further comprising selectively increasing a frequency of a clock signal generated by a clock source used by the Bluetooth transmit chain.

10. The method of claim 9, wherein the frequency of the clock signal is doubled based upon an operational state of the WLAN receive chain.

11. A device for wireless communication comprising a Bluetooth transmit chain, a wireless local area network (WLAN) receive chain, and an active interference cancellation module coupled to the Bluetooth transmit chain and the WLAN receive chain, wherein the active interference cancellation module includes a sampler configured to sample a signal from the Bluetooth transmit chain, a polyphase filter quadrature radio-frequency (RF) phase shifter configured to generate a plurality of quadrature components of the sampled signal, and combination logic configured to adjust a phase of the sampled signal by weighting and combining the plurality of quadrature components in response to digital baseband feedback to create an output signal.

12. The device of claim 11, wherein the active interference cancellation module further comprises a variable gain block in a signal path for a quadrature component configured to adjust the gain of the quadrature component.

13. The device of claim 12, wherein the variable gain block comprises at least one from the group consisting of a variable gain amplifier (VGA) and a variable capacitive divider.

14. The device of claim 11, wherein the active interference cancellation module further comprises a load adjuster configured to reduce variations in a load applied to the phase shifter.

15. The device of claim 14, wherein the load adjuster comprises a variable capacitor and the active interference cancellation module is configured to reduce variations in the load applied to the phase shifter by adjusting the variable capacitor.

16. The device of claim 15, further comprising a controller coupled to the active interference cancellation module and WLAN receive chain, the controller configured to receive feedback from the WLAN receive chain and send signals to the active interference cancellation module to adjust the variable capacitor in response to feedback from the WLAN receive chain.

17. The device of claim 11, wherein the active interference cancellation module is further configured to adjust an amplitude of output signal.

18. The device of claim 17, further comprising a controller coupled to the active interference cancellation module and WLAN receive chain, the controller configured to receive feedback from the WLAN receive chain and send signals to the active interference cancellation module to adjust the amplitude of the output signal in response to feedback from the WLAN receive chain.

19. The device of claim 18, wherein the feedback from the WLAN receive chain comprises one from the group consisting of a receive signal strength indicator (RSSI), a signal to noise ratio (SNR), a bit error rate (BER), and an error vector magnitude (EVM).

20. The device of claim 11, wherein the active interference cancellation module is further configured to output the output signal to the WLAN receive chain.

21. The device of claim 11, wherein the Bluetooth transmit chain includes a frequency source generating a clock signal, the device further comprising a circuit coupled to the frequency source of the Bluetooth transmit chain and configured to increase a frequency of the clock signal.

22. The device of claim 21, wherein the frequency of the clock signal is doubled based upon an operational state of the WLAN receive chain.

\* \* \* \* \*